US009824512B2

(12) United States Patent
Tseng et al.

(10) Patent No.: US 9,824,512 B2
(45) Date of Patent: Nov. 21, 2017

(54) ADJUSTING DIAGNOSTIC TESTS BASED ON COLLECTED VEHICLE DATA

(71) Applicant: Ford Global Technologies, LLC, Dearborn, MI (US)

(72) Inventors: Fling Finn Tseng, Ann Arbor, MI (US); Imad Hassan Makki, Dearborn Heights, MI (US); Pankaj Kumar, Dearborn, MI (US); Aed M. Dudar, Canton, MI (US); Robert Roy Jentz, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 51 days.

(21) Appl. No.: 15/016,658

(22) Filed: Feb. 5, 2016

(65) Prior Publication Data

US 2017/0228946 A1     Aug. 10, 2017

(51) Int. Cl.
*G07C 5/08*     (2006.01)
*G07C 5/00*     (2006.01)

(52) U.S. Cl.
CPC ........... *G07C 5/0808* (2013.01); *G07C 5/008* (2013.01)

(58) Field of Classification Search
CPC .............................. G07C 5/0808; G07C 5/008
See application file for complete search history.

(56) References Cited

U.S. PATENT DOCUMENTS

| 4,700,174 | A | * | 10/1987 | Sutherland | G06J 1/00 341/120 |
| 5,228,335 | A | * | 7/1993 | Clemmens | F01N 9/00 73/114.73 |
| 5,729,452 | A | * | 3/1998 | Smith | G01M 15/102 700/31 |
| 6,378,359 | B1 | * | 4/2002 | Dobson | F01N 11/00 60/277 |

(Continued)

FOREIGN PATENT DOCUMENTS

EP     1594283 A1     9/2005

OTHER PUBLICATIONS

"Jaguar Land Rover: Optimized repair of complex vehicles while adhering to regulations," International Quality & Productivity Center (IQPC); Interview with David Summers, Date Unknown.

(Continued)

*Primary Examiner* — Calvin Cheung
(74) *Attorney, Agent, or Firm* — Frank A. MacKenzie; Bejin Bieneman PLC

(57) ABSTRACT

A system comprising a processor is programmed to receive, from a plurality of vehicles, sets of diagnostic test data relating to a performed diagnostic test. Each set of diagnostic test data includes a test output value and one or more corresponding test condition values. The processor is further programmed to select some of the test output values based on selecting a function to relate the test output value to test output values from different sets of diagnostic data. The processor is further programmed to provide the test output (Continued)

value and the corresponding test conditions values as input to the selected function to obtain a plurality of scaled test output values; and generate an adjustment to the diagnostic test based at least in part on the scaled test output values.

20 Claims, 7 Drawing Sheets

(56) References Cited

U.S. PATENT DOCUMENTS

| | | | | |
|---|---|---|---|---|
| 6,529,808 | B1* | 3/2003 | Diem | G01R 31/006 701/31.5 |
| 7,155,321 | B2 | 12/2006 | Bromley et al. | |
| 7,519,458 | B2* | 4/2009 | Buckley | G01M 17/00 701/2 |
| 8,896,430 | B2 | 11/2014 | Davidson et al. | |
| 9,330,507 | B2* | 5/2016 | Alberry | G07C 5/0825 |
| 2002/0133273 | A1* | 9/2002 | Lowrey | G01M 15/04 701/29.4 |
| 2004/0157113 | A1* | 8/2004 | Kiang | G01R 31/3648 429/50 |
| 2004/0159094 | A1* | 8/2004 | Yurgil | F01N 11/007 60/277 |
| 2005/0024061 | A1* | 2/2005 | Cox | G01R 31/3693 324/426 |
| 2005/0035752 | A1* | 2/2005 | Bertness | G01R 31/007 324/120 |
| 2006/0053863 | A1* | 3/2006 | Griessbaum | G01F 25/0061 73/1.73 |
| 2006/0125483 | A1* | 6/2006 | Bertness | G01R 31/3624 324/426 |
| 2006/0225491 | A1* | 10/2006 | Booms | F02M 25/0809 73/114.39 |
| 2006/0229777 | A1 | 10/2006 | Hudson et al. | |
| 2007/0179691 | A1* | 8/2007 | Grenn | B60W 50/029 701/31.4 |
| 2007/0288134 | A1* | 12/2007 | Rollinger | F02D 41/0235 701/32.8 |
| 2007/0294033 | A1* | 12/2007 | Osentoski | G08G 1/205 701/29.3 |
| 2009/0096599 | A1* | 4/2009 | Kranz | B60C 23/009 340/459 |
| 2009/0216401 | A1 | 8/2009 | Underdal | |
| 2009/0240390 | A1* | 9/2009 | Nenadic | G05B 23/0251 701/29.1 |
| 2009/0241014 | A1* | 9/2009 | De Mareschal | G05B 9/03 714/824 |
| 2012/0004804 | A1* | 1/2012 | Beams | G01S 5/0027 701/32.7 |
| 2012/0016552 | A1* | 1/2012 | Avery | G01R 31/007 701/32.8 |
| 2012/0041638 | A1* | 2/2012 | Johnson | G07C 5/008 701/33.1 |
| 2012/0311383 | A1 | 12/2012 | Sul et al. | |
| 2013/0087624 | A1* | 4/2013 | Bertness | G06Q 99/00 235/492 |
| 2014/0249712 | A1 | 9/2014 | Margol et al. | |
| 2015/0045983 | A1* | 2/2015 | Fraser | G07C 5/008 701/1 |
| 2015/0224997 | A1 | 8/2015 | Glugla et al. | |

OTHER PUBLICATIONS

"OBD Calibration for Passenger Cars," AVL Worldwide, 2015.
United Kingdom Intellectual Property Office Search Report under Section 17(5) with Examination Opinion for Application No. GB1701739.3 dated Aug. 2, 2017 (7 pages).

* cited by examiner

ADJUSTING DIAGNOSTIC TESTS BASED ON COLLECTED VEHICLE DATA

BACKGROUND

Many vehicles include computers that are programmed to perform on-board diagnostics to identify systems that may not be operating within specified limits. These diagnostic tests are typically performed in real world conditions, for example, while the vehicle is operating, or just following operation of the vehicle. Accordingly, the results of the tests may depend on uncontrolled environmental factors and operating conditions of the vehicle such as the geographic location of the vehicle, weather conditions at the time of driving and/or at the time of the test, usage patterns of the vehicle, etc. However, present test specifications do not account for various uncontrolled (or uncontrollable) factors and may therefor provide unreliable, inaccurate, or at least less accurate than is desired, diagnostic test results.

DESCRIPTION

Introduction

Figure 1:
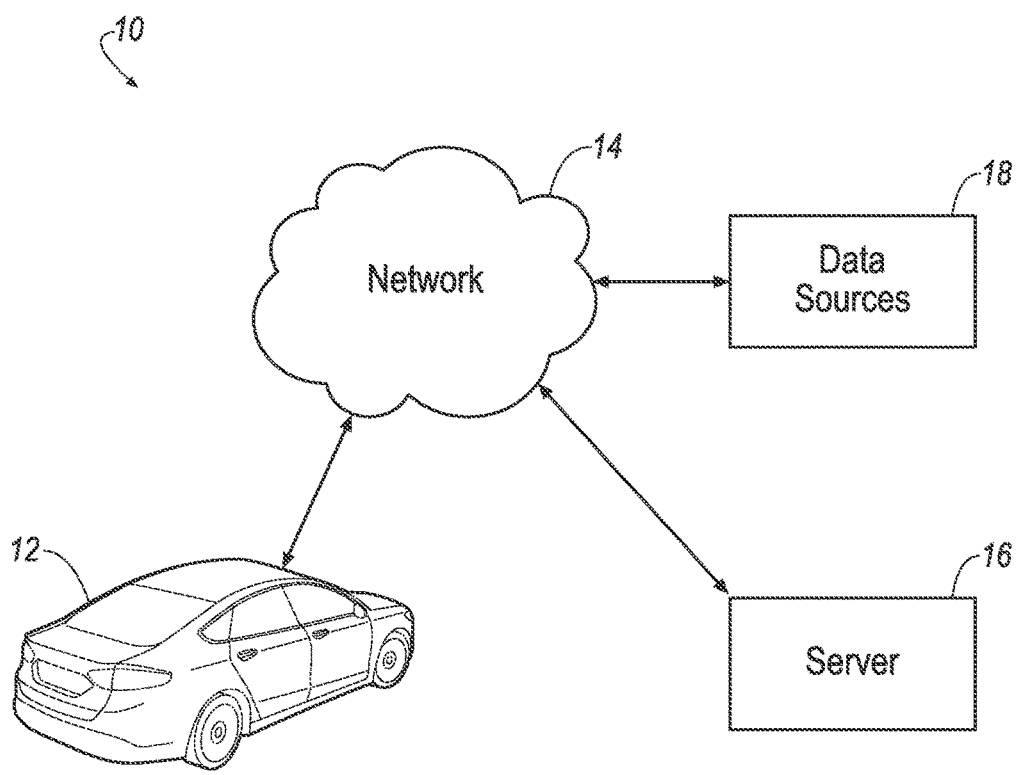
FIG. 1 is diagram of an exemplary system for adjusting vehicle on-board diagnostic testing.

A system 10, as shown in FIG. 1, includes a server 16 programmed to collect data related to multiple vehicles 12. The data from each vehicle 12 includes vehicle identification data, data concerning operating conditions, and measured parameter values for one or more diagnostic tests related to and/or performed by the vehicle 12. Identification data includes data such as vehicle model, vehicle manufacturing year, vehicle features, vehicle performance specifications, etc. Operating conditions includes data such as the location of the vehicle 12, weather conditions during operation (e.g., environmental conditions such as outside temperature, humidity, etc.), usage patterns of the vehicle 12, positions of actuators (e.g., in controllers) in the vehicle 12, electric current applied to a motor in the vehicle 12, etc. Measured test parameter values include results of diagnostic tests performed by the vehicle 12 such as, for example, a vapor pressure level or a fluid pressure level. The data may be collected by the server 16 from the vehicles 12, or from other data sources 18 such as global positioning systems, weather reporting systems, etc. The data may be collected, e.g., via a network 14.

The server 16 is programmed to collect a set of data related to a particular diagnostic test performed by respective vehicles 12. The set of data may include the identification data related to the vehicle 12, the operating conditions related to the vehicle 12 at a time of the diagnostic test, and the one or more test parameter values measured by the vehicle 12 during the diagnostic test.

The server 16 may select, from the collected sets of data, sets of data to determine an adjustment for a particular diagnostic test. Selecting the sets of data to be used may include determining, based on the vehicle identification data, operating data and test parameter values, that a function can be identified to generate scaled test parameter values that can be evaluated on a common scale. The common scale may be a predetermined scale for the particular diagnostic test, based, e.g., on reference vehicle operated under reference operating conditions. A function to generated scaled test parameter vales that can be evaluated on a common scale will be referred to herein as a normalizing function.

The selected sets of data, may, but need not, be sets of data from vehicles 12 having a similar model type, a similar manufacturing year, a similar drive train, a similar climate control system, and/or which have been operated along a similar route of travel, in a similar ambient air temperature, in a similar barometric pressure, according to a similar usage pattern, etc.

The server 16 may collect sets of data related to a diagnostic test from respective vehicles 12. The server 16 may then select, from the collected sets of data, sets of data for which a normalizing function can be applied. The server 16 may then apply the normalizing function to the selected sets of data, and generate scaled test parameter values. Based on the scaled test parameter values, the server 16 may generate an adjustment to a diagnostic test, and provide the adjustment to one or more vehicles 12. The one or more vehicles 12 associated respectively with the sets of data selected to generate the adjustment. In some cases, an adjustment based on the selected sets of data may also be applicable to other vehicles 12 that were not associated with the selected sets of data. The vehicles 12 may receive the adjustment from the server 16 and may then perform on-board diagnostic tests based on the adjustments.

System Elements

An exemplary system 10 for collecting data related to vehicles 12 is shown in FIG. 1. The system 10 includes one or more vehicles 12, a network 14, a server 16, and may further include one or more data sources 18.

Figure 2:
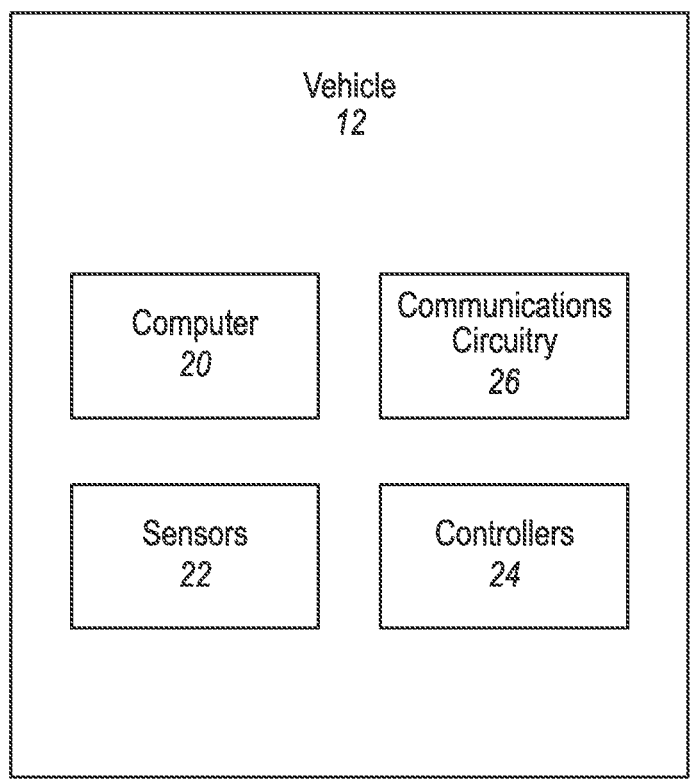
FIG. 2 is a block diagram of an exemplary vehicle for the system of FIG. 1.

The vehicle 12 is generally a land-based vehicle 12 having three or more wheels, e.g., a passenger car, light truck, etc. As described in additional detail below, and as seen in FIG. 2, the first vehicle 12 includes a computer 20. The computer 20 may be programmed to perform and/or collect data related to on-board diagnostic tests on one or more vehicle systems, as described in additional detail below. Additionally, the vehicle 12 may transmit data to the server 16 related to the on-board diagnostic tests. The data may include identification data, data from sensors, data from controllers, data received from data sources such as global positioning systems, weather tracking systems, traffic tracking systems, etc.

For example, the vehicle 12 computer 20 may perform a diagnostic test to detect leaks in an evaporative emissions (EVAP) system. The first vehicle 12 computer may actuate one or more vehicle components under control of the computer 20. Actuating a vehicle component under control of the computer 20, as used herein, may include a vehicle computer 20 sending instructions, e.g., via a vehicle 12 communications bus, to a vehicle electronic control unit (ECU or "controller") 24, and the vehicle controller 24, based on the instructions, actuating a component in the first vehicle 12. For example, in order to perform the diagnostic test, the vehicle 12 computer 20 may actuate a valve to open or close a fuel vapor cavity within the vehicle 12. The vehicle 12 computer 20 may send an instruction to a valve controller 24. The valve controller 24 may control an electric motor to open or close the valve. The valve controller 24 may further provide feedback to the computer 20 indicating that the valve is in the open or closed position.

The vehicle 12 computer 20 may further receive data from one or more sensors. The sensors may indicate, for example, a pressure within the cavity.

The network 14 represents one or more mechanisms by which the one or more vehicles 12, the server 16 and one or more data sources 18 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services.

Data sources 18 may be systems such as global positioning systems, traffic tracking systems, weather tracking systems, etc., and may provide data related to an operating condition of the vehicle 12. The data source 18 may be programmed, for example, to generate and provide map data, weather data, geo-coordinates (e.g., latitude, longitude), traffic data, etc. as is known, to the one or more vehicles 12 or the server 16.

The vehicle 12 further includes one or more sensors 22 that are provided to collect data related to the first vehicle 12 and the environment in which the first vehicle 12 is operating. By way of example, and not limitation, sensors 22 may include e.g., thermometers, barometers, humidity sensors, altimeters, cameras, lidar, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors 22 may be used to sense the environment in which the vehicle 12 is operating such as weather conditions, the grade of a road, the location of a road, neighboring vehicles 12, etc. The sensors 22 may further be used to collect dynamic vehicle 12 data related to operations of the vehicle 12 such velocity, yaw rate, steering angle, engine speed, brake pressure, oil pressure, the power level applied to controllers in the vehicle, connectivity between components, etc. The sensors 22 may still further be used to measure parameters and generate parameter values related to one or more diagnostic tests, such as fuel level, evaporative emissions pressure, etc.

The communications circuitry 26 may include hardware, software, firmware, etc., such as are known, and may be configured for one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc. for converting messages from one protocol to another protocol. Some functions, e.g., encoding functions, may be realized via firmware.

The types of wireless communications may include WiFi communications, dedicated short range communications (DSRC), two-way satellite communications (e.g., emergency services), one way satellite communications (e.g., receiving digital audio radio broadcasts), AM/FM radio, etc. Additionally, the communications circuitry 26 may be communicatively coupled to the computer 20 via, e.g., a wired network such as a controller area network (CAN) bus or local interconnect network (LIN) bus, as is known.

The one or more controllers 24 for the vehicle 12 may include known electronic control units (ECUs) or the like including, as non-limiting examples, an engine controller, a valve controller, a seat controller, a power steering controller, a door lock controller, a door latch controller, a climate controller, a mirror adjustment controller, a seatbelt controller, a brake controller, etc. Each of the controllers 24 may include respective processors and memories, one or more actuators, and may send instructions to and/or receive data from one or more sensors 22, as is known. The controllers 24 may be programmed and connected to a vehicle 12 communications bus to receive instructions from the computer 20 and control an actuator based on such instructions. For example, a valve controller may receive an instruction to open or close a valve and may cause an actuator to displace a valve cylinder. The actuator may be, e.g., a motor, or a solenoid. One or more sensors 22, may, e.g., detect the action of the actuator. For example, a sensor 22 in the valve controller may detect that the valve cylinder has been displaced. The controller 24 may provide data regarding the status of the valve cylinder to the computer 20.

The computer 20 includes a processor and a memory. The memory includes one or more types of computer-readable media, and storing instructions executable by the processor for performing various operations, including as disclosed herein. Further, the computer 20 may include and/or be communicatively coupled to one or more other computers, including e.g., vehicle components such as the sensors 22, and controllers 24, which likewise as is known may include respective processors and memories. Communications may be performed, e.g., via a controller area network (CAN) bus or local interconnect network (LIN) bus, etc., as is known.

The computer 20 may be programmed, as is known, to perform diagnostic tests and determine the operability of on-board systems such as on-board sensors 22, on-board controllers 24, and the on-board communications circuitry 26.

Processes

Performing On-Board Diagnostic Tests

Generally, the computer 20 of a vehicle 12 may be programmed to perform one or more on-board diagnostic (OBD) tests. The computer 20 may test, e.g., for the proper operation of a particular component or group of components in the vehicle 12. The computer 20 may, at a particular time, for example based on a trigger event as discussed below, initiate a diagnostic test by sending instructions to one or more controllers 24. The controllers 24 may put the vehicle 12 in a condition to perform the diagnostic test, i.e., actuate and/or control one or more vehicle 12 components in a predetermined manner and/or to be in a predetermined position for the test. The condition may include, for example, placing one or more valves in particular positions, applying a particular force by a motor, etc. Upon placing the vehicle 12 in the condition to perform the diagnostic test, the computer 20 may receive data from one or more sensors 22. Based on the data from the sensors 22, the computer 20 can confirm whether a value of a measured test parameter is within a predetermined range. The parameter value being within the predetermined range may indicate that the component being tested by the computer 20 is operating within specification. The parameter value being outside of the predetermined range may indicate that the component being tested is not operating within specification.

For example, the computer 20 may send an instruction to a controller 24 to displace a master cylinder by a specified amount in order to apply a pressure to a brake fluid line. The computer 20 may receive, from the controller 24 that the master cylinder is displaced by the specified amount. Based on the displacement of the master cylinder, the computer 20 may determine an expected range of brake fluid pressure. The computer 20 may receive, from a pressure sensor 22 arranged in the brake fluid line, the pressure of brake fluid in the brake fluid line. The computer 20 may compare the data from the sensor 22 and determine that the brake fluid pressure is within the expected range. The predetermined range may be, e.g., above a predetermined threshold, e.g. 40 bar.

The expected range of a test parameter value may be a function of one or more other values. For example, a threshold for evaporative emissions pressure may be determined based in part on a fuel level of the vehicle 12.

Common on-board diagnostic tests include manifold pressure sensing diagnostics, engine coolant temperature sensing diagnostics, fuel injection system diagnostics, knock sensor diagnostics, exhaust gas recirculation function diagnostics, catalyst system efficiency, function diagnostics, etc.

Trigger Events for Collecting Data Related to On-Board Diagnostic Tests

The computer 20 may be programmed to recognize many different types of trigger events to collect data related to an on-board diagnostic test. As non-limiting examples, collecting data may be triggered periodically (e.g., once per hour when the vehicle is operating), at a time when the vehicle 12 has been operating above a certain speed (e.g., 60 miles/hour) for a period of more than five minutes, when the vehicle 12 is operating and within a predetermined range of ambient temperature (e.g. between 0 and 25 degrees Celsius), at an end of a trip when the vehicle 12 is at rest but the engine is still warm (e.g., coolant at a temperature above 50 degrees Celsius) from operation, at the end of a trip having a particular usage pattern (e.g., remained at a speed above 30 miles/hour for at least 30 minutes), at an end of a trip when the vehicle 12 traveled in a particular geographic region, or traversed a particular section of highway, when the vehicle 12 is started after cooling to ambient temperature, when the vehicle 12 has traveled a particular number of miles, e.g., 1000 miles, since collecting the last data related to the diagnostic test, etc. Additionally, trigger events may include, for example, a request from the server 16 for data for a particular test, a request from a technician, via, for example, a CAN bus, to collect data related to a particular diagnostic test, etc.

Based on recognizing a trigger event for collecting data related to the diagnostic test, the computer 20 may collect the data. The computer 20 may send instructions to set one or more actuators into a position to collect the data. After setting the actuators into position, the computer 20 may receive data from one or more sensors 22. The data may include measured values of test parameters related to the diagnostic test.

Types of Test Parameters Used for Diagnostic Tests

The computer 20 may be programmed to collect and analyze data for different types of test parameters for a particular diagnostic test. The data may include values for one or more test parameters. In some cases, the diagnostic test may collect absolute values. For example, a test parameter value may be the temperature of coolant when the vehicle 12 is turned off. In other cases, the test parameter may be a change in value. For example, the computer 20 may measure a change in brake fluid pressure when a master cylinder is displaced from a first position to a second position. In other cases, the test parameter may be the difference between a first value of a parameter when the vehicle 12 is at rest, and a second value of the parameter when the vehicle 12 has been operating for a particular period of time, or is operating at a particular engine temperature, etc.

Collecting and Storing Data, Providing Data to the Server

As described above, the computer 20 may be programmed to initiate collecting data related to a diagnostic test based on recognizing a trigger event. The computer 20 may collect the data, and store the results in a memory associated with the computer 20. The memory may be, for example, included in the vehicle 12. The data may be organized as sets of data, e.g., a set of data related to a particular diagnostic test performed by a particular vehicle 12.

In some cases, the computer 20 may provide the data to the server 16 upon completion of the test. In other cases, the computer 20 may store the data, and provide the data to the server 16 at a later time, for example, upon receiving a request from the server 16.

Further, as described above, the computer 20 may collect data related to a diagnostic test based on a request from the server 16. Upon collecting the data, the computer 20 may provide the data to the server 16.

As discussed above, the data provided to the server 16 may include parameter values measured by sensors 22 in the vehicle 12. Data provided to the server 16 may further include vehicle identification data such as vehicle type, vehicle model year, vehicle components, vehicle mileage, etc. The data may further include operating conditions of the vehicle such as a geographic location of the vehicle 12, e.g., geo-coordinates from a Global Position System or like navigation system, e.g., latitude and longitude data, and or other geographic identifying information (e.g., geographic regions or entities, such as State of Michigan, Wayne County, East Coast, etc.), a travel route of the vehicle 12 (from Detroit to Chicago, along a section of Interstate 95, within a city, through mountainous terrain, etc.), weather conditions at the time of driving and/or at the time of the test (air temperature, relative humidity, sunny or cloudy, etc.), usage patterns of the vehicle 12 (highway driving, starting and stopping in heavy traffic, a speed profile along a path of travel, etc.), and road conditions (dry, wet, snowy, etc.). The data may still further include the time when a diagnostic test was performed or the time when a trip occurred in order to synchronize the data with data from other sources such as data sources 18.

Selecting Sets of Data for Determining Adjustments for a Diagnostic Test

The server 16 may select sets of data received from vehicles 12 and data sources 18, such that the sets of data can be used for determining an adjustment for a particular type diagnostic test. Selecting sets of data may include determining whether, for each of the sets of data, a normalizing function can be identified to generate scaled test parameter values that can be evaluated on a common scale with each of the other selected sets of data. The common scale may be a predetermined scale for the particular diagnostic test, based, e.g., on a reference vehicle operated under reference operating conditions.

In order to simplify, or even make possible, the identification of a normalizing function for sets of data related to a diagnostic test, the server 16 may select sets of data from vehicles 12 that, e.g., performed a same diagnostic test, and are, e.g., of a similar vehicle type, have similar characteristics, and/or were operating under similar operating conditions.

Vehicles of a similar type may include, e.g., vehicles 12 which perform the same type of diagnostic test, having similar characteristics, and for which a normalizing function may be identifiable to adjust test parameter values for differences between the respective vehicles. For example, two vehicles 12 may be a same model type, and have the same drive train features (engine type, transmission type, etc.). A first one of the vehicles 12 may have been driven 110,000 miles while a second one of the vehicles may have been driven 30,000 miles. A function may be known that adjusts the values of test parameter values from each of these vehicles to a reference vehicle 12. The reference vehicle 12 may be, for example, a vehicle 12 taken directly from production, and tested under laboratory conditions. In a similar manner, normalizing functions may be identifiable for, e.g., different vehicles features (type of engine, type of transmission, year of manufacture, etc.).

Similar operating conditions may include operating conditions for which a normalizing function may be identifiable to adjust test parameter values for differences between the operating conditions. For example, to determine a particular adjustment for a diagnostic test, the server 16 may select sets of data from vehicles 12 that operated in similar weather conditions. Similar weather conditions may be defined as within a range of weather conditions wherein the test results vary according to a function, and can be normalized to account for differences in the weather conditions. For example, similar weather conditions may include being within an ambient temperature range between −20 and 30 degrees Celsius, and within a relative humidity range between 30% to 70%.

The server 16 may further, e.g., select sets of data from respective vehicles 12 and data sources 18 related to vehicles 12 that were driven along a similar path of travel. Similar paths of travel may be defined as paths of travel for which a function can be used to normalize test results between the respective different paths. For example, similar paths of travel may include paths wherein vehicles 12 travel along, e.g., 90% the same roads, or along the same stretch of highway, for the 100 miles before conducting the diagnostic test.

Still further, the server 16 may select sets of data for from respective vehicles 12 that were driven with a similar usage pattern. A similar usage pattern may be defined, for example, as a usage pattern wherein the test results vary according to a function, and can be normalized to account for differences in the usage patterns. For example, a usage pattern may consider a percentage of time that a vehicle operated within a range of predetermined speeds such as between 30 and 60 miles/hour. First and second vehicles 12 may have similar usage patterns if the percentage of time a first vehicle operated within a particular speed range (e.g., 90% of the time between 30 and 60 miles/hour), is within +/−10% of the percentage of time the second vehicle operated within the particular speed range for the 100 miles before conducting the diagnostic test.

Note that, in some cases, it may be possible to select sets of data such that no normalization is necessary for a particular factor, i.e., that the normalization function or functions are unity. For example, data from two vehicles having the same model, features and manufacturing year may not require normalization related to the type of vehicle. Data from two vehicles 12 that traveled along a same portion highway at a similar time of day (for example within 10 minutes of each other) may not require normalization related to travel path or for weather conditions.

The server 16 may select sets of data related to vehicles 12 such that all factors except one factor are similar, and the one factor is different from the others in a defined way. In this way, the server 16 may be able to identify the influence of the one factor which is different, on diagnostic test results.

For example, the server 16 may select sets of data wherein the type of each vehicle is substantially similar, the weather conditions for driving and testing were substantially similar, the usage patterns were substantially similar, but a first portion of the vehicles 12 traveled along a first route, and a second portion of the vehicles traveled along a second route. Based on a comparison of the test results from the first portion of vehicles 12 with the test results of the second portion of vehicles 12, the server 16 may be able to identify an adjustment for variations in travel routes.

Further, in some cases, the computer 20 may select sets of data where normalization functions are not known for multiple test parameters. For example, the computer 20 may include data related to a particular type of diagnostic test from every vehicle 12 that performed that type of test. By analyzing the data, the computer 20 may identify relationships between, for example, a particular test parameter and a particular operating condition, that were previously unknown.

Normalizing Test Results

As discussed above, the server 16 may be programmed to select sets of data from vehicles 12 such that data from each vehicle 12 may be normalized with data from each other vehicle 12 with each of the other sets of data. Data may be normalized (adjusted by a normalization function), to compensate for differences between, for example, types of vehicles 12 or operating conditions of the vehicles 12.

This may be done, for example, by adjusting each of the sets of data to a reference set of data. For example, a fuel vapor pressure in each vehicle 12 may vary according to a vapor temperature by a known function. The server 16 may record the pressure value measured for each vehicle 12 along with the vapor temperature for the respective vehicle 12 at the time of the test. The server 16 may then convert each of the pressure values that were measured to an equivalent pressure at a selected reference temperature, for example, 20 degrees Celsius. In this manner, pressure values measured at different temperatures may be combined for use in an analysis.

Similarly, difference between vehicle types may be compensated, in the case that a function can be established to normalize the differences in measured values between the different vehicle types to, for example, a reference vehicle 12. By normalizing values in this way, the server 16 can increase the amount of data that can be used in determining adjustment factors for particular diagnostic tests.

Generating Adjustments for Diagnostic Tests

The server 16 may further be programmed to analyze the data from the selected sets of data, and to determine an adjustment for a vehicle diagnostic test based on the sets of data. For example, the server 16 may be programmed to determine a dependency of an evaporative emissions test to a path of travel prior to performing the test. The server 16 may collect data from a plurality of first vehicles 12 that traveled along a first path prior to conducting the evaporative emissions test and from a plurality of second vehicles 12 that traveled along a second path prior to conducting the evaporative emissions test. The server 16 may normalize the data from each of the first vehicles according to type of vehicle, operating conditions such as weather etc., and identify representative first test value data for the plurality of first vehicles. The server 16 may further normalize the data from each of the second vehicles according to type of vehicle, operating conditions such as weather etc., and identify representative second test value data for the plurality of second vehicles. Based on the representative first test value data and representative second test value data, the server 16 may identify differences in test values related to the path of travel.

The server 16 may further be programmed to provide adjustment factors to the vehicles 12 associated with the selected sets of data, based on the analysis. For example, the server 16 may determine that the second vehicles had a value of a particular test parameter that was 3% higher, on average, from the value of the test parameter for the first vehicles 12. Based on this determination, the server 16 may propose to increase a threshold for the test value by 3% for vehicles 12 that traveled along the second path, relative to the threshold used for vehicles that traveled along the first path.

The process may be repeated, for example, for multiple travel paths. In this manner, a diagnostic test for the particular test parameter may be adapted to a variety of travel paths. Adjusting the test parameter to the variety of travel paths may increase the reliability (e.g., less false positive results, less false negative results, etc.) of the diagnostic tests performed along these travel paths, and may further increase the number of travel paths that may be considered for conducting the diagnostic test.

Exemplary Test Data Indicating a Threshold Adjustment

Figure 3A:
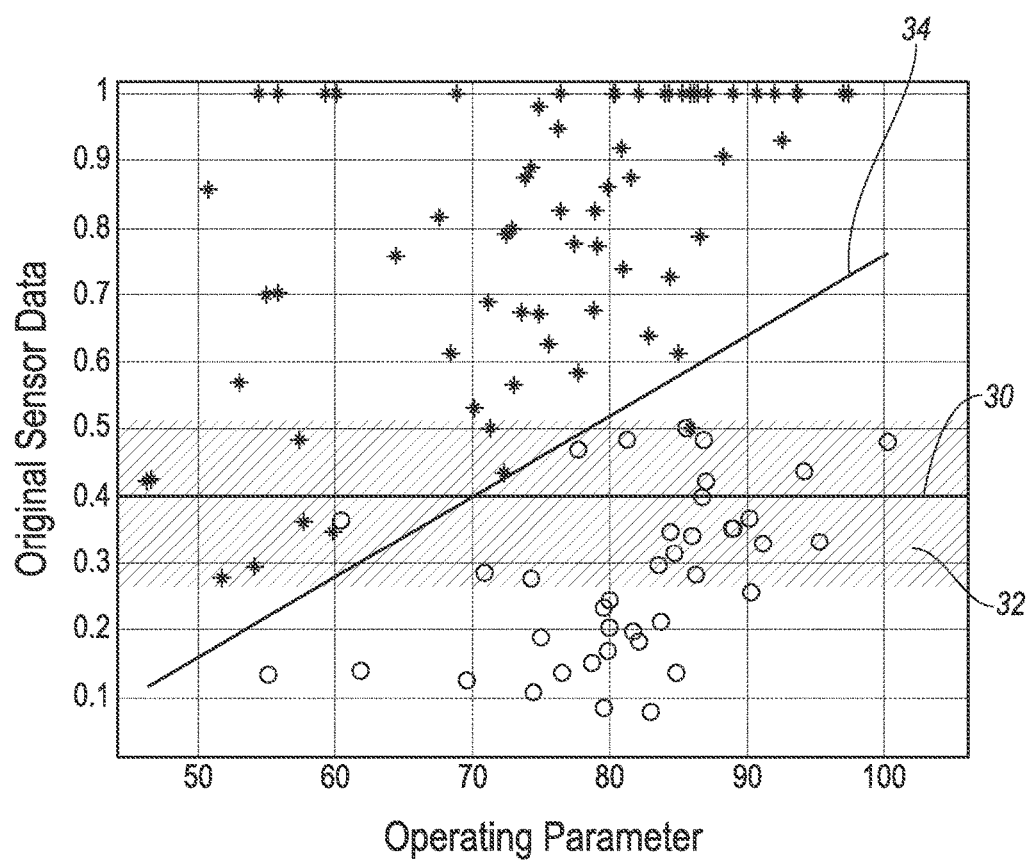
FIG. 3A is an exemplary graph of a diagnostic test performed under a first test condition.

Exemplary test data indicating a threshold adjustment are shown in FIG. 3A. FIG. 3A is a graph showing a distribution of exemplary sensor data as a function of an operating parameter value. Data points indicated with an "o" represent data from a vehicle component or sub-system operating outside a specification. Data points indicated with a "*" represent data from a vehicle component or sub-system that is operating within specification.

An exemplary first threshold 30, that is independent of the operating parameter (i.e., is a horizontal line), which may be used for a pass/fail threshold for the diagnostic test is indicated on the graph. Data points above the first threshold 30 may be, for example, determined to pass the diagnostic test, and data points below the first threshold 30 determined to fail the diagnostic test.

As can be seen in FIG. 3A, a number of "o" symbols representing vehicle components or subsystems that are operating outside of the specification, appear above the first threshold 30, and would be determined by the diagnostic test to pass. That is, the diagnostic test would generate false positive results. Similarly, a number of "*" symbols representing vehicle components or vehicle sub-systems that are operating within the specification, appear below the first threshold 30, and would be determined by the diagnostic test to fail, resulting in false negatives.

One approach for reducing the number of false positive and false negative diagnostic test results is the implementation of a first buffer zone 32. The computer 20 implementing the diagnostic test could, for example, not evaluate vehicle components or sub-systems having data points within the first buffer zone 32. This may, however, result in a low decision rate for the diagnostic test.

Alternatively, as further shown in FIG. 3A, based on analysis of data from multiple vehicles 12, however, the server 16 or another computing device may identify a relationship between the sensor data and the operating parameter. A new threshold 34 for the diagnostic test may be generated to account for the relationship between the sensor data and the operating parameter.

In the case of FIG. 3A, it can be seen that the lower limit of "*" sensor data increases with an increase in the operating parameter. Similarly, the upper limit of "o" increases with an increase in the operating parameter. Based on the data, a second threshold 34 may be established to perform the diagnostic test which takes into account the relationship between sensor data values and the operating parameter. The second threshold 34 results in a substantial reduction in false positive ("o" above the threshold) and false negative ("*" below the threshold) diagnostic test results.

Figure 3B:
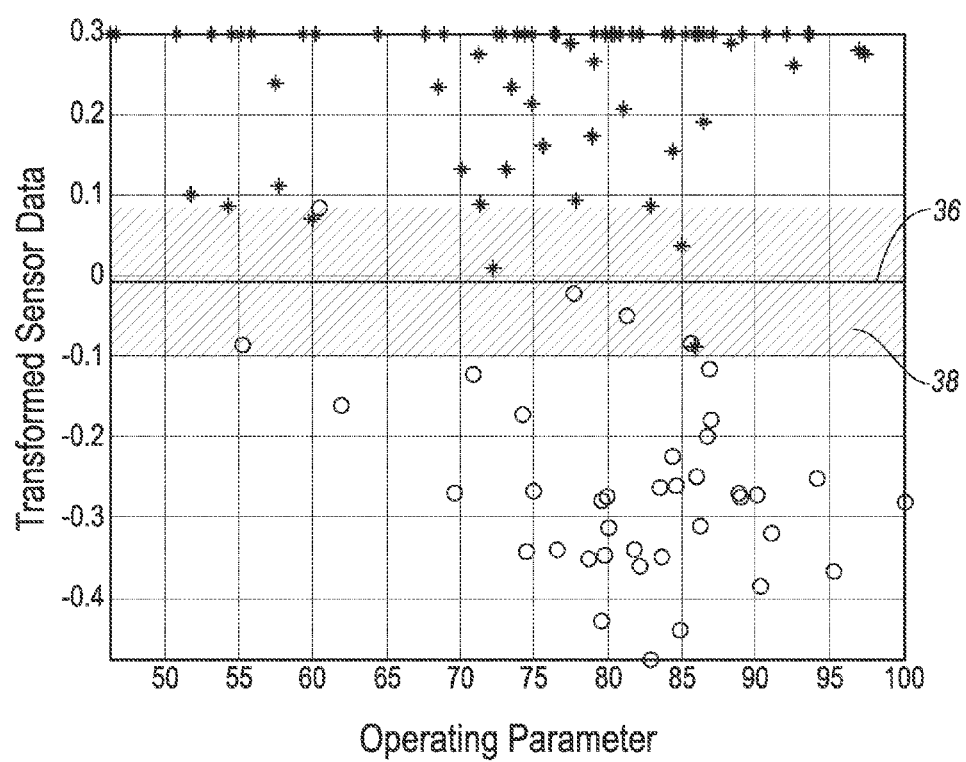
FIG. 3B is an exemplary graph of a diagnostic test performed under a second test condition.

Alternatively or additionally to adjusting a threshold for a diagnostic test, once a relationship is identified between the sensor data and the operating parameter, data may be transformed to account for the relationship. FIG. 3B is a graph showing distribution of exemplary sensor data for a same test as a function of the same operating parameter value, wherein the sensor data have been transformed by a function to generate transformed sensor data. The function accounts for the identified relationship between the sensor data and the operating parameter. Using the transformed data, the diagnostic test may be performed with a threshold that is independent of the operating parameter (is a horizontal line). For example, following transformation of the data to account for the relationship between the sensor data and the operating parameter, the data may be distributed as shown in FIG. 3B. A third threshold 36, which is independent of the operating parameter (horizontal) may be established to distinguish between pass and fail (transformed) sensor data. Due to the transformation of the sensor data, a significantly lower number of false positives and false negatives are observed.

As with the previous FIG. 3A, a second buffer zone 38 could also be applied. In this case, the false positives and false negatives could be eliminated. However, a significantly smaller number of "no decisions" would result.

For example, FIGS. 3A and 3B could be graphs of an evaporative emissions test. The evaporative emission leak check monitor (EVAP) may be performed, e.g., according to the engine off natural vacuum (EONV) method. The y axis of each graph indicates a scale for normalized values for a change in pressure following a key-off event. The x axis of each graph indicates a vapor temperature. As shown in FIG. 3A, the sensor data may show a dependence on the vapor temperature such that the lower limit of sensor data from vehicle components or sub-systems operating in specification increases with increasing vapor temperature, and the upper limit of sensor data from vehicle components or sub-systems operating outside of the specification also increases. This may result in a large number of false positive ("o" above the threshold) and false negative ("*" below the threshold) diagnostic test results.

The server 16, may, however, based on the observed dependence of the sensor data values on the vapor temperature, generate the second threshold 34 of FIG. 3A. Performing the diagnostic test according to the second threshold 34 may result in a reduced number of false positive and false negative diagnostic test results.

FIG. 3B may represent the same data as shown in FIG. 3A, wherein the data have been transformed, for example by the server 16, to account for the relationship between changes in pressure and the vapor temperature. As discussed above, a diagnostic test based on the third threshold 36 independent of the vapor temperature may then be applied to the transformed data.

Exemplary Process Flows

Figure 4:
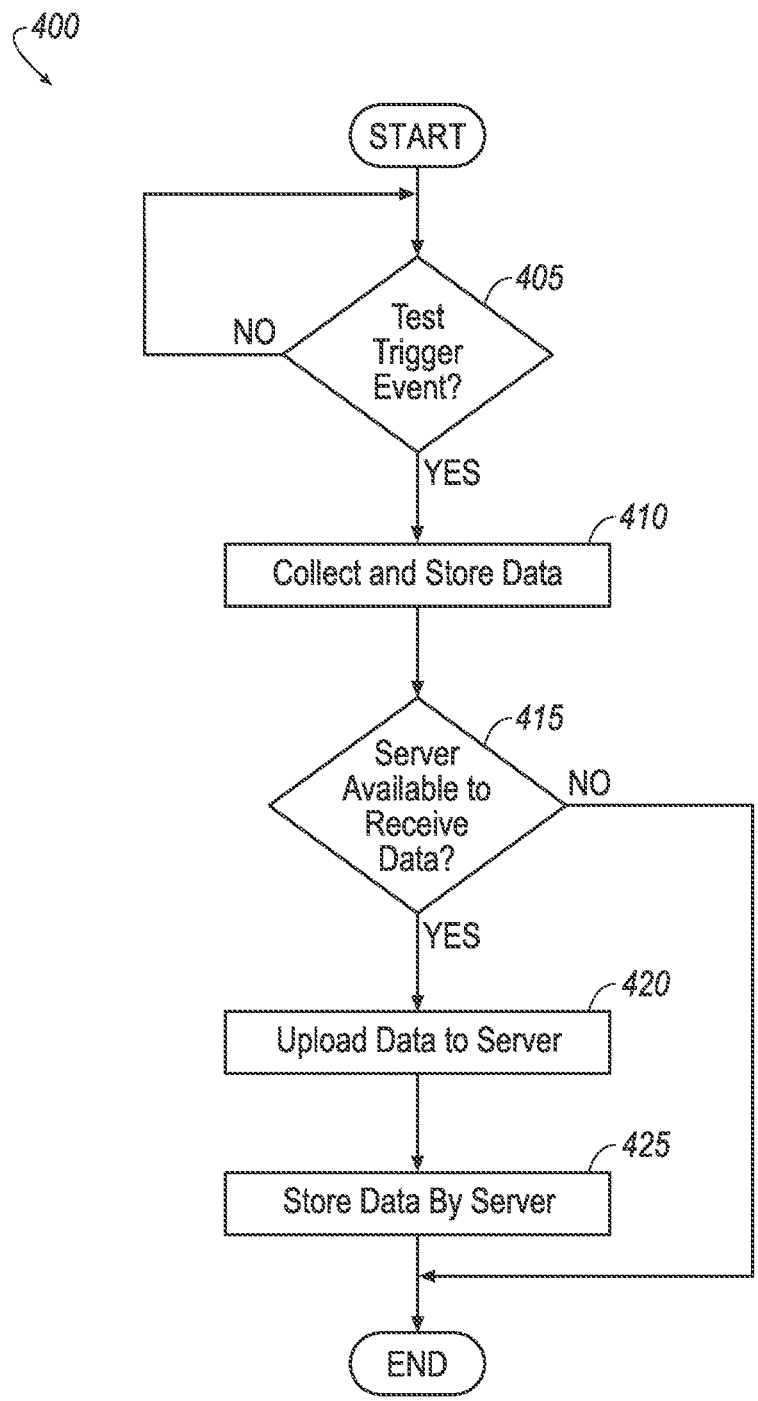
FIG. 4 is a diagram of an exemplary process for collecting data to be used for adjusting a diagnostic test.

FIG. 4 is a diagram of an exemplary process 400 for collecting data to be used for generating an adjustment for an on-board diagnostic test. The process starts in a block 405.

In the block 405, the vehicle 12 computer 20 determines whether a trigger event to collect data related to a diagnostic test is present, as described above (and trigger events for OBD tests and the like being known). In the case that no trigger event is detected, the process continues in the block 405. In the case that a trigger event is detected, the process continues in a block 410.

In the block 410, the computer 20 collects data related to the diagnostic test as described above. The computer 20 may actuate one or more controllers, for example a valve controller to open or close a valve, or a cylinder, to change a pressure level in a cavity, etc. The computer 20 may further receive data from one or more sensors 22. The computer 20 may store the data, together with other data related to the diagnostic test such as a time of the test, ambient conditions (average ambient temperature, relative humidity, average barometric pressure, average vapor temperature, average vapor pressure, etc.) during one or more execution phases of the test, location (obtained for example from a global positioning system), vehicle operating conditions (turned on, turned off, vehicle speed, engine speed, etc.), feedback from controllers (valve positions, electric current applied to a motor), etc. Upon storing the sensor data and other data related to the diagnostic test, the process 400 continues in a block 415.

In the block 415, the computer 20 determines whether the server 16 is available to receive data. For example, the computer 20 may send a message to the server 16 indicating that data related to a particular type of diagnostic test is available, and request confirmation that the server 16 is available to upload the data. In the case that the server 16 responds, for example, within a predetermined period of time such as 1 minute, that the server 16 is available to upload the data, the process 400 continues in a block 420. In the case that the server 16 does not respond, or indicates that the server 16 is not available to upload the data, the process 400 ends.

In the block 420, the vehicle 12 uploads the data to the server 16, as is known. The process 400 then continues in a block 425.

In the block 425, the server 16 stores the data. The test parameter data may be stored together with identification of the vehicle 12 which measured/provided the data, operating conditions of the vehicle 12 at a time and/or prior to measuring the data, and data of data sources 18 such as weather conditions, traffic conditions, etc. at a time the test parameters were measured.

On-board and off-board data may be crossed compared to determine if there are significant differences. Significant differences may be, for example, differences greater than +/−10%, difference from a mean value greater than 3 standard deviations, etc. In a case that a particular vehicle 12 show consistent inconsistency in one or more of its sensors critical for evaluating the effectiveness or trustworthiness of a monitor execution, the information shall be discounted when compared with the vehicles 12 that do not have such issues. When the server 16 has stored the data, the process 400 ends.

Figure 5:
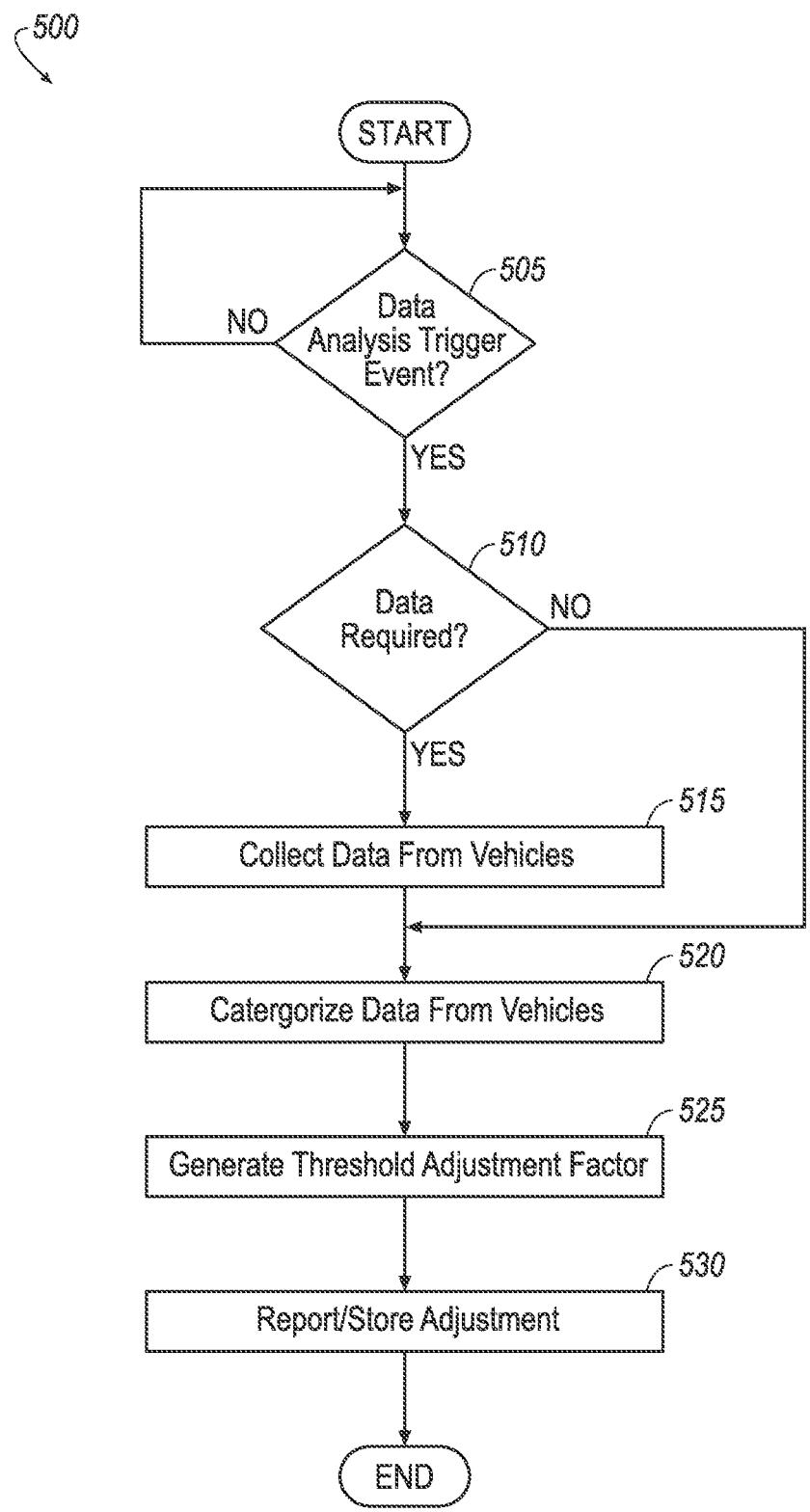
FIG. 5 is a diagram of an exemplary process for generating an adjustment of the diagnostic test based on data from multiple vehicles.

FIG. 5 is a diagram of an exemplary process 500 for generating an adjustment of a threshold for an on-board diagnostic test based on data from multiple vehicles 12. The process 500 starts in a block 505.

In the block 505, the server 16 may determine whether a trigger event for analyzing data related to a diagnostic test has occurred. The server 16 may be programmed, for example, to analyze data related to the diagnostic test periodically, for example once per day. Alternatively, the server 16 may be programmed to analyze data when the server 16 has received data from an additional predetermined number of vehicles 12, for example from 100 additional vehicles 12. As yet another example, the server 16 may receive an input from an operator indicating that the server 16 should analyze data related to the diagnostic test. In the case that the server 16 determines that a trigger event has occurred, the process 500 continues in a block 510. In the case that the server 16 does not determine that a trigger event has occurred, the process 500 continues in the block 505.

In the block 510, the server 16 determines whether the server 16 needs to collect additional data to perform the analysis. For example, in order to perform a meaningful analysis of data related to a particular diagnostic test, the server 16 may require data from 100 vehicles 12, or 100 vehicles 12 of a similar type and/or tested under similar operating conditions. In the case that the server 16 determines that the server 16 needs to collect additional data, the process 500 continues in a block 515. In the case that the server 16 determines that the server 16 has sufficient data, the process 500 continues in a block 520.

In the block 515, the server 16 collects data from one or more additional vehicles 12. The server 16 may identify one or more vehicles 12 which may have performed the diagnostic test, and request that the vehicles 12 provide the server 16 with data related to the test. The server 16 may receive the data from the vehicles 12.

The server 16 may store the sensor data together with the vehicle identification data, the operating condition data, etc. such that all of the data required for an analysis of a particular test parameter can be retrieved from the data storage. The server 16 may further collect data from data sources 18 related to the diagnostic test data. For example, based on the time at which a test was performed, the server 16 may download weather data, traffic data, global positioning data, etc. related to the vehicle 12 or the environment of the vehicle 12 during performance of the diagnostic test. Upon receiving the data from the computer 20, and the data sources 18, and storing the data, the process 500 continues in a block 520.

In the block 520, the server 16 selects sets of data to be used to generate an adjustment to the diagnostic test, as described above. The process 500 continues in a block 525.

In the block 525, the server 16 generates, based on the selected sets of data related to the diagnostic test, an adjustment for the diagnostic test as described in the section as described above. The process 500 continues in a block 530.

In the block 530, the server 16 may provide the adjustment for the diagnostic test to one or more vehicles 12. Additionally or alternatively, the server 16 may store the generated adjustment, until the adjustment is requested by a vehicle 12. Upon providing the adjustment for the diagnostic test to the one or more vehicles, and/or storing the adjustment factor, the process 500 ends.

Figure 6:
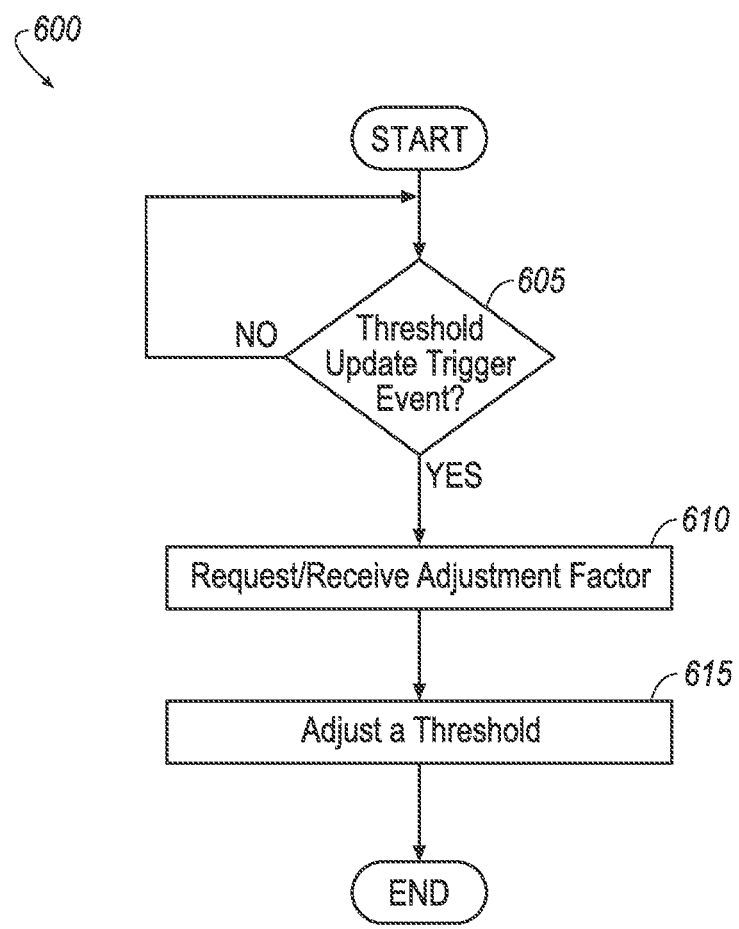
FIG. 6 is a diagram of an exemplary process for adjusting the diagnostic test.

FIG. 6 is a diagram of an exemplary process 600 for adjusting an on-board diagnostic test threshold based on an adjustment. The process 600 starts in a block 605.

In the block 605, the vehicle 12 computer 20 determines whether a trigger event to update a diagnostic test for one or more vehicles 12. For example, the computer 20 may be programmed to update a diagnostic test periodically, e.g., once per day or once every three months. As another example, the computer 20 may determine that the vehicle 12 may be programmed to update the diagnostic test when the vehicle 12 has moved from a first geographic location to a second geographic location (e.g., moved more than 100 miles). Different geographic areas may cause the ambient condition, e.g., temperature swings, barometric pressure, relative humidity, etc., to significantly vary. A threshold setting for a diagnostic test for the first geographic area may be different than the corresponding threshold setting for the diagnostic test for the second geographic area. As another example, the computer 20 may be programmed to update the diagnostic test when a vehicle component failed the diagnostic test, in order to insure that the diagnostic test is operating with the most up-to-date test parameters. In the case that the computer 20 identifies a test trigger, the process continues in a block 610. Otherwise, the process continues in the block 605.

In the block 610, the computer 20 requests and receives and the adjustment from the server 16. The process 600 continues in a block 615.

In the block 615, the computer 20 adjusts the diagnostic test. The computer 20 may, e.g., modify a stored parameter or function specifying a threshold in the diagnostic test. The process 600 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system comprising a computing device including a processor and a memory, the memory storing instructions executable by the processor such that the processor is programmed to:
  receive, from each of a plurality of vehicles, respective sets of diagnostic test data relating to a performed diagnostic test, each set of diagnostic test data including a test output value and one or more corresponding test condition values;
  select at least one of the test output values respectively from each of at least two vehicles from the plurality of vehicles based at least in part on selecting a function to relate a respective selected test output value to test output values from different sets of diagnostic data;
  provide the at least one of the test output values from each of the at least two vehicles and the corresponding test conditions values as input to the selected function to obtain a plurality of scaled test output values; and
  actuate one or more vehicle components according to an adjustment to the diagnostic test that is based at least in part on the scaled test output values.

2. The system of claim 1, wherein the processor is further programmed to:
  provide the adjustment to a vehicle that provided one of the selected test output values.

3. The system of claim 1, wherein the adjustment to the diagnostic test includes an adjustment of a threshold for evaluating the test output value.

4. The system of claim 1, wherein the set of scaled output values are comparable on a scale that is predetermined for the diagnostic test.

5. The system of claim 4, wherein the predetermined scale for the diagnostic test is based at least in part on a reference vehicle.

6. The system of claim 4, wherein the predetermined scale for the diagnostic test is based at least in part on reference test conditions.

7. The system of claim 1, wherein the selected function to accept the at least some of the test output values is unity.

8. The system of claim 1, wherein selecting the at least one of the output values is based in part on at least one of a route of travel, an ambient air temperature value, a barometric pressure, a relative humidity and a usage pattern.

9. The system of claim 1, wherein the test data output value includes an engine off natural vacuum.

10. The system of claim 1, wherein the one or more test condition values include a fuel level.

11. The system of claim 1, wherein the test data output value includes an air mass summation from key-on to key-off.

12. The system of claim 1, further comprising a second computing device including a second processor and a second memory, the second memory storing instructions executable by the second processor such that the second processor is programmed to:
receive the test output value from a sensor in a vehicle; and
transmit the test output value together with a vehicle identification and the one or more corresponding test conditions to the processor.

13. The system of claim 12, wherein the second processor is further programmed to:
receive the adjustment to the diagnostic test from the processor; and
perform the diagnostic test based on the adjustment.

14. A method implemented by a processor comprising:
receiving, from each of a plurality of vehicles, respective sets of diagnostic test data relating to a performed diagnostic test, each set of diagnostic test data including a test output value and one or more corresponding test condition values;
selecting at least one of the test output values respectively from each of at least two vehicles from the plurality of vehicles based at least in part on selecting a function to relate a respective selected test output value to test output values from different sets of diagnostic data;
providing the at least one of the test output values from each of the at least two vehicles and the corresponding test conditions values as input to the selected function to obtain a plurality of scaled test output values; and
actuating one or more vehicle components according to an adjustment to the diagnostic test that is based at least in part on the scaled test output values.

15. The method of claim 14, further comprising:
providing the adjustment to a vehicle that provided one of the selected test output values.

16. The method of claim 14, wherein the set of scaled output values are comparable on a scale that is predetermined for the diagnostic test.

17. The method of claim 14, wherein the predetermined scale for the diagnostic test is based at least in part on a reference vehicle.

18. The method of claim 17, wherein the predetermined scale for the diagnostic test is based at least in part on reference test conditions.

19. The method of claim 14, further comprising:
receiving, by a second processor, the test output value from a sensor in a vehicle; and
transmitting, by the second processor, the test output value together with a vehicle identification and the one or more corresponding test conditions to the processor.

20. The method of claim 19, further comprising:
receiving, by the second processor, the adjustment for the diagnostic test from the processor; and
performing, by the second processor, the diagnostic test based on the adjustment.

* * * * *